United States Patent [19]

van Tol

[11] Patent Number: 4,561,098
[45] Date of Patent: Dec. 24, 1985

[54] RECEIVER FOR FFSK MODULATED DATA SIGNALS

[75] Inventor: Nicolaas van Tol, Hilversum, Netherlands

[73] Assignee: U.S. Philips Corporation, New York, N.Y.

[21] Appl. No.: 410,779

[22] Filed: Aug. 23, 1982

[30] Foreign Application Priority Data

Sep. 29, 1981 [NL] Netherlands ............................ 8104441

[51] Int. Cl.$^4$ ............................ H04B 1/16; H03D 3/00
[52] U.S. Cl. ............................................ 375/49; 375/82; 375/88; 329/126; 307/522
[58] Field of Search ................ 375/88, 82, 80, 49, 375/9, 3, 110, 81; 329/50, 126, 128; 307/517, 522, 234

[56] References Cited

U.S. PATENT DOCUMENTS

| | | | |
|---|---|---|---|
| 3,437,932 | 4/1969 | Malakoff | 375/49 |
| 4,287,596 | 9/1981 | Chari | 375/49 |
| 4,344,039 | 8/1982 | Sugiura et al. | 329/50 |
| 4,447,909 | 5/1984 | Hjorring | 375/88 |

OTHER PUBLICATIONS

Graf, *Modern Dictionary of Electronics*, 1977, p. 297.

*Primary Examiner*—Robert L. Griffin
*Assistant Examiner*—Raymond C. Glenny
*Attorney, Agent, or Firm*—Thomas A. Briody; William J. Streeter; Leroy Eason

[57] ABSTRACT

A receiver for FFSK modulated signals operating in the time domain so as to effect a rapid acquisition of the data signal and the generated clock signal and to maintain the synchronization irrespective of the data pattern. For that purpose the receiver comprises a zero-crossing detector and a window generator for selecting by means of this window generator from the zero-crossings detected by the zero crossing detector two consecutive zero-crossings of the lower frequency of the two signal frequencies of the FFSK signal for sychronization of the regenerated clock signal.

3 Claims, 2 Drawing Figures

RECEIVER FOR FFSK MODULATED DATA SIGNALS

BACKGROUND OF THE INVENTION

1. Field of the Invention

The invention relates to a receiver for FFSK modulated data signals, comprising a clock signal regenerator, a phase selection arrangement for generating a clock signal from a received FFSK modulated data signal and a differential data demodulator to which the clock signal regenerator is connected for recovering the data signal under the control of the clock signal regenerator from a received FFSK signal applied to the data demodulator.

Such a receiver is known from the article "Coherent Demodulation of Frequency Shift Keying with Low Deviation Ratio" by Rudi de Buda, published in IEEE Trans. On Com. - June 20, 1972, pages 429–435.

In the receiver described in the above article, the clock signal is generated from a received FFSK modulated data signal by applying it, after squaring, to two phase-locked loops which are tuned to twice the frequency of one of the two frequency signals of the FFSK signal and twice the frequency of the other frequency signal, respectively. After subtracting the signals thus obtained and dividing by two a clock signal is generated and after addition and dividing by four a phase reference signal for the clock signal is generated. The ambiguity then still remaining in the phase of the clock signal has no effect on the demodulated data because of the use of differential demodulation.

Such a receiver has the drawback that at the occurrence of a sequence of ones or zeros the certainty about the phase of the regenerated clock signal decreases relative to the duration of these sequences, or may even be lost completely. In addition, such a receiver is too complicated for may uses. Thus, in the field of vehicle detection simple receivers for FFSK modulated data signals are required, so as to enable their economic use in large numbers.

The invention has for its object to provide a completely novel concept of a receiver for FFSK modulated data signals which can be easily manufactured in integrated circuit form and wherein the receiver has a short acquisition time and furthermore the synchronization is maintained, irrespective of the data pattern.

SUMMARY OF THE INVENTION

According to the invention the receiver of the type described in the opening paragraph is characterized in that it comprises a zero-crossing detection arrangement for generating a clock signal from the zero-crossings of an FFSK modulated signal and the phase selection arrangement is connected to the zero-crossing detector and arranged for selecting two consecutive zero-crossings of the signal having the lower frequency of the two signal frequencies of the FFSK signal and that the phase selection arrangement is connected to the clock signal regenerator for synchronizing the clock signal with the zero-crossing selected by the phase selection arrangement.

This has the considerable advantage that the receiver operates in the time domain whereby rapid acquisition of the clock and data signals is possible and furthermore manufacture in integrated circuit form is very simple.

The invention and its advantages will now be further described by way of example with reference to the accompanying drawing.

DETAILED DESCRIPTION OF THE PREFERRED EMBODIMENT

Figure 1:
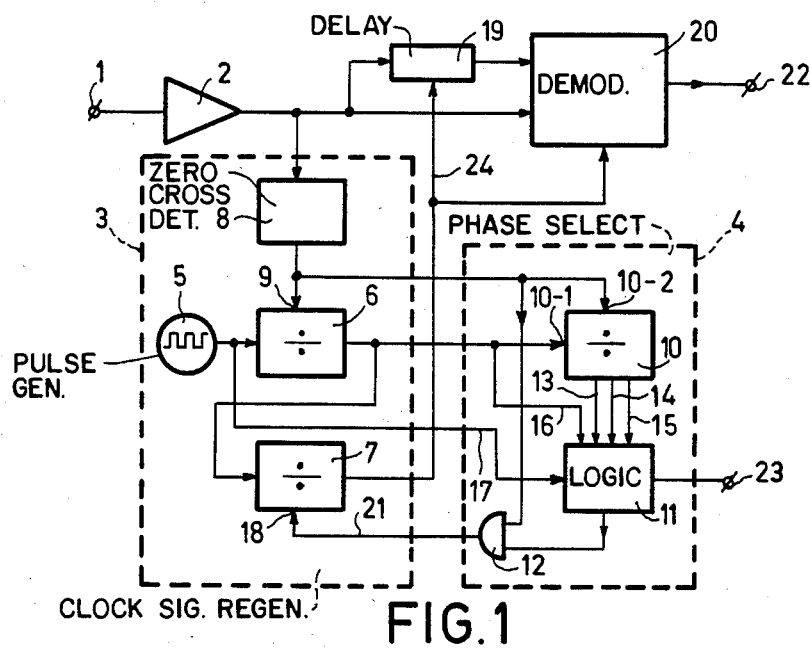
FIG. 1 shows an embodiment of a receiver for FFSK modulated data signals in accordance with the invention.
Figure 2:
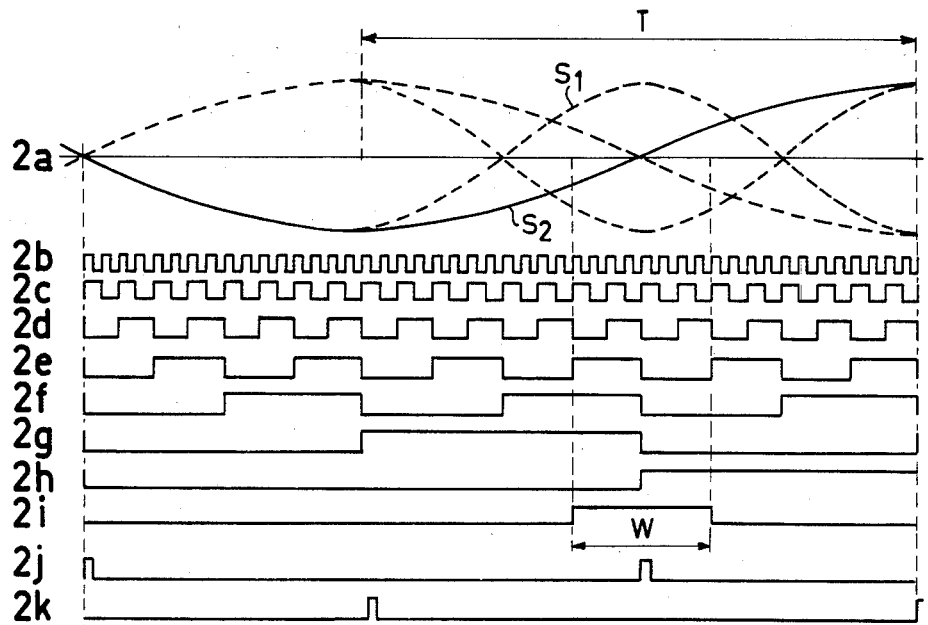
FIG. 2 shows signals which may be produced in the embodiment shown in FIG. 1.

The receiver shown in FIG. 1 has an input terminal 1 for receiving FFSK (fast frequency shift keying) modulated data signals. Such a signal is shown in FIG. 2a. More specifically, FIG. 2a shows a sinusoidal FFSK signal whose signal $s_1$ having the higher frequency is chosen equal to the bit rate $1/T$ of the data signal, so that the signal $s_2$ having the lower frequency is equal to half the bit rate of the data signal. In this embodiment, the logic signal value "0" of the data signal is represented by the signal $s_2$ whose frequency is, for example, 50 kHz and the logic signal value "1" is represented by the signal $s_1$ whose frequency by the choice of $s_2$ is 100 kHz and the bit period T of the data signal is in that case 10 $\mu$sec. In addition, the FFSK signal is assembled such that transitions from signal $s_1$ to $s_2$ and vice versa are effected in the peaks of these sinusoidal signals. After having been amplified in the amplifier 2 this FFSK signal is applied to inter alia a clock signal regenerator 3. This clock signal regenerator 3 comprises a pulse generator 5 which supplies a pulse train which in this embodiment has a pulse repetition rate of 3.2 MHz, this pulse signal being shown in FIG. 2b. A first divider 6 having in this embodiment a divisor equal to eight is connected to this pulse generator 5. The pulse train thus obtained is shown in FIG. 2e and has a pulse repetition rate equal to 400 kHz.

As appears from FIG. 2a, any zero-crossings occurring in the FFSK signal are shifted at least $\frac{1}{2}$ period T relative to each other. The clock signal regenerator comprises a zero-crossing detector 8 connected to the amplifier 2. The zero-crossings in the FFSK signal detected by this zero-crossing detector 8 are applied to a resetting input 9 of the first divider 6, each detected zero-crossing resetting the first divider 6 to the zero position.

From the pulse train (FIG. 2e) supplied by the first divider 6 a pulse-shaped clock signal, shown in FIG. 2g, having a pulse repetition rate equal to 100 kHz is derived by means of a second divider 7, which in this embodiment has a divisor equal to four. In view of the fact that the divisor of the second divider is four, the clock pulse is synchronized, but for a multiple of T/4 in the time.

In order to eliminate this ambiguity as regards the time, the receiver incorporates a phase selection arrangement 4 which selects the consecutive zero-crossings which are located at a mutually maximum distance. As shown by FIG. 2a consecutive zero-crossings having a mutually maximum distance are the zero-crossings of the lower frequency signal of the FFSK modulated data signal.

For that purpose the phase selection arrangement 4 comprises a signal window generator 10, 11, formed by a third divider 10 and a logic circuit 11. The input 10-1 of the third divider 10 is connected to the first divider 6.

The resetting input 10-2 of this third divider 10 is connected to the zero-crossing detector 8, whereby this divider 10 is reset by each zero-crossing in the FFSK signal.

From the first pulse train of 400 kHz supplied by the first divider 6, shown in FIG. 2e, the third divider 10 derives by dividing by 2, 4 and 8, respectively, the respective 200 kHz, 100 kHz and 50 kHz pulse trains shown in the FIGS. 2f, 2g and 2h. The pulse trains thus obtained are applied to the logic circuit 11 via the conductors 13, 14 and 15. Via the conductors 17 and 16 also the 3.2 MHz pulse signal of the pulse generator 5 and the 400 kHz signal are supplied, this 400 kHz signal being applied to the logic circuit 11 by the first divider 6. The logic circuit 11 derives the window signal w shown in FIG. 2i from these signals. This window signal is equal to e.f.g.+$\overline{e}$.f.g., wherein e, f and g represent signals shown in the FIGS. 2e, 2f and 2g. This window signal w is applied to an input of an AND-gate 12, the other input of which is connected to the zero-crossing detector 8. Consequently, this AND-gate circuit 12 transmits only those zero-crossings of the zero-crossings occurring in the FFSK which are located at a distance approximately equal to the distance between the zero-crossings of the lower of the two frequency signals of the FFSK modulated data signal. This synchronizing signal derived by AND gate circuit 12 is shown in FIG. 2j. In order to allow a maximum jitter without the proper operation being disturbed by zero-crossings of the higher frequency signal, the optimum width of the window is equal to one-quarter bit period T, which follows directly from the signals shown in FIG. 2a.

The synchronizing signal (2j) supplied by the AND-gate circuit 12 is applied to the resetting input 18 of the second divider 7 which under the control of this signal synchronizes the clock signal shown in FIG. 2g.

From the above it follows that when the clock signal is regenerated once in its correct phase, this regeneration in the correct phase is maintained. Consequently, the present receiver is suitable for use in transmission systems wherein a synchronizing signal is transmitted prior to a message, for example by having a message preceded by at least two bits of the lower frequency signal in the FFSK signal, which in this embodiment is the signal having the logic signal value "0". This synchronizing signal serves for adjusting the regenerated clock signal to the correct phase non-recurrently in each message stream.

In addition, the receiver comprises a delay element 19 and a demodulator 20 to which the FFSK signal is directly applied after amplification by amplifier 2. Furthermore, in a manner not further shown, a sampling signal is derived from the second divider 7 in the form of a pulse train whose pulses are shifted half a bit period T with respect to the signal transitions of the synchronizing signal shown in FIG. 2j, this sampling signal being shown in FIG. 2k.

This sampling signal is applied to a control input of the delay element 19 via conductor 24 and is also applied to the demodulator 20. Under the control of the sampling signal each received data signal is delayed by one bit period T in the delay element 19, whereafter it is applied to the demodulator 20. Under the control of the sampling signal the demodulator 20 compares, at the instants of occurrence of each sampling pulse, the FFSK signal applied directly to this arrangement with the data signal which was delayed by one bit period T.

As can be seen from FIG. 2a, on receipt of a signal $s_1$ the amplitude and the phase of the FFSK signal will not have changed after one bit period T, which in this embodiment will be identified as the data signal having the logic signal value "1". On receipt of a signal $s_2$ the amplitude is also the same, but the phase of the FFSK signal has shifted 180° after one bit period T, which will be identified as a data signal having the logic signal value "0". The demodulated data signal thus obtained is supplied from terminal 22.

It should be noted that by means of the signal window generator also a qualification signal can be generated which indicates the reliability of the received signals.

So it follows from FIG. 2a that a received signal having a zero-crossing exceeding the value 9/8 bit period T or which falls short of the value 7/8 bit period T is unreliable. For that purpose the logic circuit 11 may be provided with a further logic circuit which derives such a quality signal from the signals shown in the FIGS. 2b to 2h, inclusive, in a manner which corresponds to the manner in which the window signal w was derived.

The qualification signal thus obtained can be taken from output 23 and determines whether the demodulated data signal will be approved or not approved.

What is claimed is:

1. In a receiver for FFSK modulated data signals, comprising a clock signal regenerator, a phase selection arrangement for generating a synchronizing signal from a received FFSK modulated data signal, and a differential data demodulator to which the clock signal regenerator is connected for recovering the data signal under control of the clock signal regenerator from a received FFSK signal applied to the data demodulator, the improvement wherein the receiver comprises a zero-crossing detection arrangement for generating a clock signal from the zero-crossings of a received FFSK signal and the phase selection arrangement is connected to the zero-crossing detector and arranged for selecting only zero-crossings of the signal having the lower frequency of the two signal frequencies of the FFSK signal and that the phase selection arrangement is connected to the clock signal regenerator for synchronizing the clock signal with the zero-crossings selected by the phase selection arrangement;

wherein the phase selection arrangement comprises a signal window generator connected to the zero-crossing detector and to the clock pulse regenerator for generating a window within which only zero-crossings of the lower frequency signal of a received FFSK modulated data signal are comprised and that an AND-gate circuit is connected to the signal window generator and to the zero-crossing detector, the gate circuit being connected to the clock pulse regenerator; and wherein the clock signal regenerator comprises a pulse signal generator, a first divider having a resetting input and being connected to the pulse signal generator, a second divider connected to the first divider and having a resetting input, the zero-crossing detector is connected to the resetting input of the first divider for synchronizing this divider with every detected zero-crossing of the received FFSK modulated signal, the signal window generator is connected to the first divider and the AND-gate circuit is connected to the resetting input of the second divider.

2. A receiver for continuous FFSK modulated data signals having a maximum amplitude at the boundary between two adjacent data bits, wherein a first logic value is represented by a high frequency signal and a second logic value is represented by a low frequency signal having a frequency nominally equal to a predetermined fraction of said high frequency, the frequency of said low frequency signal being subject to deviation from a nominal value thereof due to certain sequences of the logic values of said signals, comprising clock signal regenerator means for detecting zero crossings of said data signals, generating zero crossing signals in response to each of said zero crossings, and generating clock signals synchronized to said zero crossing signals;

phase selector means connected to said clock signal regenerator means for receiving said zero crossing signals and adapted to select therefrom only zero crossing signals of said low frequency signal which occur within a time interval window corresponding to a maximum acceptable deviation of the frequency of said low frequency signal from the nominal value thereof, such selected zero crossing signals constituting synchronizing signals having transitions occurring essentially undelayed with respect to zero crossings of said low frequency signal;

means for applying said synchronizing signals to said clock signal regenerator means to synchronize said clock signals;

and demodulator means connected to said clock signal regenerator means, for receiving said modulated data signals and demodulating the so received signals under control of said clock signals.

3. A receiver for continuous FFSK modulated data signals having a maximum amplitude at the boundary between two adjacent data bits, wherein a first logic value is represented by a high frequency signal and a second logic value is represented by a low frequency signal having a frequency nominally equal to a predetermined fraction of said high frequency, the frequency of said low frequency signal being subject to deviation from a nominal value thereof due to certain sequences of the logic values of said signals, comprising:

clock signal regenerator means for detecting zero crossings of said data signals, generating zero crossing signals in response to each of said zero crossings, and generating clock signals synchronized to said zero crossing signals;

phase selector means comprising means connected to said clock signal regenerator means for generating a time interval window signal of a duration corresponding to a maximum acceptable deviation of the frequency of said low frequency signal from a nominal value thereof; such phase selector means further comprising an AND-gate connected to said window signal generator means and to said clock signal regenerator means for selecting from said zero crossing signals of said low frequency signal only those which occur simultaneously with said window signal, such selected zero crossing signals constituting synchronizing signals;

means for applying said synchronizing signals to said clock signal regenerator means to synchronize said clock signals;

and demodulator means connected to said clock signal regenerator means, for receiving said modulated data signals and demodulating the so received signals under control of said clock signals.

* * * * *